United States Patent [19]

Rosenberg

[11] Patent Number: 4,539,398

[45] Date of Patent: Sep. 3, 1985

[54] AFFINITY FRACTIONATION OF HEPARIN ON IMMOBILIZED CONCANAVALIN A

[75] Inventor: Robert D. Rosenberg, Brookline, Mass.

[73] Assignee: Riker Laboratories, Inc., St. Paul, Minn.

[21] Appl. No.: 569,551

[22] Filed: Jan. 9, 1984

Related U.S. Application Data

[63] Continuation of Ser. No. 341,748, Jan. 22, 1982, abandoned.

[51] Int. Cl.$^3$ ............................................. C08B 37/10
[52] U.S. Cl. ...................................................... 536/21
[58] Field of Search ........................................ 536/21

[56] References Cited

U.S. PATENT DOCUMENTS

| | | | |
|---|---|---|---|
| 2,884,358 | 4/1959 | Bush et al. | 536/21 |
| 4,119,774 | 10/1978 | Andersson et al. | 536/21 |
| 4,122,250 | 10/1978 | Schmer | 536/21 |
| 4,175,182 | 11/1979 | Schmer | 536/21 |
| 4,301,153 | 11/1981 | Rosenberg | 536/21 |
| 4,303,651 | 12/1981 | Lindahl et al. | 536/21 |
| 4,351,938 | 9/1982 | Barnett | 531/21 |

Primary Examiner—Johnnie R. Brown
Attorney, Agent, or Firm—Pahl, Lorusso & Loud

[57] ABSTRACT

A highly discriminating technique utilizing Concanavalin A, immobilized on a solid substrate, e.g. sepharose 4B, for the fractionation of heparin is disclosed. The heparin to be fractionated is incubated with antithrombin whereby a fraction complete with the antithrombin and the whole is then either passed through a column of the immobilized Concanavalin A or slurried with same. In both modes that fraction of the heparin complexed with the antithrombin is selectively absorbed by the immobilized Concanavalin A and constitutes the anticoagulant active fraction. That heparin which complexes with the antithrombin can be further fractionated to yield yet more highly active fractions by complexing the heparin in stages, adding an increment of a molar amount of antithrombin in each stage. A high molecular weight fraction (18,000–22,000 daltons) or a low molecule weight fraction (6,000–8,000 daltons), isolated from the heparin of animal tissue origin by chromatography, are the preferred heparin preparations for complexing with the antithrombin.

23 Claims, No Drawings

AFFINITY FRACTIONATION OF HEPARIN ON IMMOBILIZED CONCANAVALIN A

This application is a continuation of Ser. No. 341,748, filed Jan. 22, 1982, now abandoned.

BACKGROUND OF THE INVENTION

This invention relates to a method of treating heparin preparations to isolate a heparin fraction having improved anticoagulant activity and to the improved preparation.

Heparin is a mucopolysaccharide composed of amino sugar and uronic acid residues which is obtained from beef, porcine, sheep, whale, or other mammalian tissue by extraction with a solution of potassium acetate, alkaline ammonium sulfate and the like. Commercial heparin preparations are now widely available from many U.S. drug companies and are distributed primarily for use as intravascular anticoagulants. Recently, heparin has been used clinically as a therapeutic agent for preventing intravascular emboli formation which commonly result in pulmonary embolism and stroke.

Heparin preparations are known to be heterogeneous on a molecular level. Thus, they exhibit a considerable degree of polydispersity in molecular size, variations in the ratio of glucuronic acid to iduronic acid, alterations in the amount of ester and N-sulfation, and differing extents of N-acetylation. Changes in any of these parameters have been correlated only to a very limited extent with heparin's anticoagulant potency. Accordingly, it has been widely assumed that its anticoagulant activity is not traceable to a single specific heparin structure, and in any event, no precise relationship between its structure and function has been forthcoming.

A heparin fractionation technique has now been reported that is based upon the avidity of the complex carbohydrate for antithrombin. See U.S. Pat. No. 4,301,153 to Robert D. Rosenberg entitled "Heparin Preparation", and "Anticoagulant Activity of Heparin: Separation of High Activity and Low-Activity Heparin Species by Affinity Chromatography on Immobilized Antithrombin", *FEBS. LETTERS*, Vol. 66, No. 1, pp 90–93 (July 1976), the teachings of which are incorporated herein by reference. Both procedures utilize antithrombin bound to a sepharose matrix to isolate anticoagulantly active mucopolysaccharide.

SUMMARY OF THE INVENTION

A new and highly discriminating affinity technique utilizing Concanavalin A has now been discovered which enables fractionation of heparin species of all molecular sizes. Further, it has now been discovered such a technique can be used to subfractionate that heparin fraction which is characterized by its ability to complex with antithrombin and by its high degree of anticoagulant activity, thus isolating fractions of yet higher anticoagulant activity.

The method of the present invention utilizes Concanavalin A immobilized on a solid substrate, for example, Sepharose 4B. The heparin preparation to be fractionated is then incubated with a quantity of antithrombin to complex a portion of the heparin having anticoagulant activity. The whole incubation medium is then brought into contact with Concanavalin A immobilized on a solid substrate to selectively bind to the solid phase that fraction of the heparin which is complexed with antithrombin, leaving a depleted heparin pool as the liquid phase. The heparin fraction may then be eluted from the solid phase.

By utilizing small increments of a molar amount of antithrombin and incubating each increment with the heparin preparation in successive stages, those subfractions of the antithrombin-complexing heparin fraction which have the highest degree of anticoagulant activity may be isolated. Thus, an amount of antithrombin constituting a minor portion of a molar amount may be contacted with the initial heparin preparation and incubated to complex a portion of the heparin. The whole incubation admixture is then contacted with the immobilized Concanavalin A as by passing it through a column of the Concanavalin A immobilized, for example, on Sepharose 4B or by adding the immobilized Concanavalin A to it to form a slurry, incubating the slurry and then forming a column of the resulting solid phase. The column (from either mode) is then washed with a solution capable of selectively eluting the bound heparin fraction and subsequently with a solution capable of eluting the antithrombin. An additional amount of antithrombin is then added to and incubated with the remaining (depleted) heparin pool and the aforementioned steps of contacting with the immobilized Concanavalin A and elution are then repeated. In this manner the most highly active fraction of heparin, constituting approximately 10% of that fraction of heparin capable of complexing with antithrombin, may be isolated.

In the preferred modes of operation a low molecular weight heparin fraction (6000–8000 daltons) or a high molecular weight fraction (18,000–22,000 daltons) is isolated from heparin of animal tissue origin and is used in the present invention as the heparin preparation to be incubated with antithrombin.

Accordingly, one object of the present invention is provision of a method of separating commercially available heparin into active and inactive forms, the provision of an improved heparin for general anticoagulation purpose, and the provision of an improved intravascular anticoagulant.

Another object of the invention is to purify commercially available heparin preparations.

Still another object is to isolate an active molecular species from heparin samples which are homogeneous at the molecular level.

A further object is to isolate the inactive molecular species from heparin samples.

Yet another object is to isolate the most active fraction of that portion of heparin of animal tissue origin which is characterized by its ability to complex antithrombin.

Other objects and further scope of applicability of the present invention will become apparent from a reading of the detailed description to follow.

DESCRIPTION OF THE PREFERRED EMBODIMENTS

Physically heterogeneous, heparin of the type commonly utilized for anticoagulant therapy of human subjects is the starting material from which the active heparin fraction of the invention is produced. Suitable starting materials are available from commercial drug manufacturers such as Riker Laboratories, Sigma Chemical Company, Organon Corporation, and the Upjohn Company. The process for purifying these preparations involves incubation in an aqueous solution with a sample of antithrombin (AT cofactor) obtained from plasma. Only a portion of the total chemical mass of the commercial heparin sample can react with the AT cofactor to produce a heparin-AT cofactor complex and the remainder appears to be incapable of forming a stable complex. While the amount of heparin which participates in complex formation varies somewhat from one sample to the next, the presence of an active fraction is not limited to a particular heparin starting material.

In the experiments reported in the working examples which follow, heparin of procine origin was obtained from the Wilson Chemical Co. at an early state in the manufacturing process, prior to treatment with oxidizing agents. This crude mucopolysaccharide preparation was subsequently purified by cetylpyridinium chloride precipitation. Approximately 4 gm of this material were filtered at flow rates of 40 ml/hr through a column of Sephadex G-100 (Obtained from Pharmacia Fine Chemicals) (5×190 cm) equilibrated with 0.15 M NaCl in 0.01 M Tris-HCl, pH 7.5. Fractions of molecular weight 6000–8000 daltons and 18,000–22,000 daltons were pooled. Based upon six separate experiments, the specific anticoagulant potencies of these products averaged 250 units/mg and 125 units/mg, respectively. These products were concentrated by rotary evaporation and extensively dialyzed against 0.15 M NaCl in 0.01 M Tris-HCl, pH 7.5, prior to use.

The antithrombin protein (AT cofactor) is not commercially available at the present time. However, a useful procedure for its isolation from human plasma is disclosed in detail in an article entitled "The Purification and Mechanism of Action of Human Antithrombin-Heparin Cofactor", *Journal of Biological Chemistry*, Vol. 248, pp. 6490–6505, (R. D. Rosenberg et al., 1973). Briefly, the purification procedure comprises a five-step process wherein the AT cofactor is purified from fresh human plasma by heat defibrination and treatment with barium carbonate, adsorption-elution on aluminum hydroxide, gel filtration on Sephadex G-200, chromatography on DEAE-Sephadex A-50, chromatography on DEAE-cellulose, and preparative isoelectric focusing in sucrose density gradients. This purification method is highly reproducible and results in an approximately 11 percent yield. The procedures for purification of the antithrombin are further discussed in U.S. Pat. No. 4,301,153 entitled "Heparin Preparation" by Rosenberg, the teachings of which are incorporated herein by reference.

Concanavalin A immobilized on Sepharose 4B is available commercially. That used in the working examples which follow was obtained from Pharmacia Fine Chemicals. Concanavalin A is a phytohemagglutin derived from the jack bean (*Canavalia ensiformis*) as a homogeneous protein that is free from sulfur, has a molecular weight of 68,000, and is a potent hemagglutinin. See, for example, "Immunosuppressive Activity of Concanavalin A" by Markowitz et al, *Science* 163, 476 (1969) and the literature cited therein. It has now been found, suprisingly, that the commercial lectin matrix (immobilized concanavalin A) binds antithrombin and a heparin-antithrombin complex but exhibits minimal avidity for the free mucopolysaccharide (heparin). Further, it has been found that heparin complexed with protease inhibitor (antithrombin) that is bound to concanavalin A-Sepharose can be eluted with a high salt wash. Some batches of commercial concanavalin A-Sepharose have shown a minor but significant affinity for free heparin. This undesirable property can be suppressed by employing small amounts of dextran sulfate (Mn=500,000) in all reaction mixtures prior to affinity fractionation. The latter component can be removed from the final mucopolysaccharide product by Sephadex G-100 gel filtration.

EXAMPLE 1

Affinity Fractionation of HMW Heparin

Antithrombin was initially added to a mucopolysaccharide (heparin) preparation of molecular weight 20,000 daltons (HMW heparin) at a molar ratio of 0.21. The limiting amount of protease inhibitor employed resulted in complex formation between the antithrombin and mucopolysaccharide with the highest affinity for this plasma protein. This stage of the fractionation was conducted by adding 16.15 mg of antithrombin to 30 mg of HMW heparin. The reaction mixture of 10 ml was incubated at 24° for 30 min and then filtered through a column of Concanavalin A-Sepharose (0.6×3.5 cm) equilibrated with 0.1 M NaCl in 0.01 M Tris-HCl, pH 7.5. The affinity matrix was washed with two column volumes of the above buffer and bound mucopolysaccharide —$H(CB)_1$— was eluted from the antithrombin-Concanavalin A-Sepharose with 1.0 M NaCl in 0.01 M Tris-HCl, pH 7.5. Upon completion of the above procedure, the protease inhibitor was desorbed from the lectin matrix with 0.4 M methylD-mannoside and 0.15 M NaCl in 0.01 M Tris-HCl, pH 7.5. The second cycle of affinity fractionation was initiated by admixing antithrombin at a molar rate of 0.21 with the partially depleted HMW heparin pool —$H(U_1)$— obtained from cycle I. The resultant solution was handled as described above to isolate $H(B_2)$ and $H(U_2)$. The third, fourth, fifth, and sixth cycles of affinity fractionation were subsequently conducted in a like manner. In each instance, the protease inhibitor was added to the pool of heparin generated during the preceding stage of fractionation, the mucopolysaccharide-antithrombin interaction product was filtered through Concanavalin A-Sepharose and the complex sugar was harvested free of extraneous protein. The molar ratios of antithrombin to heparin utilized during these four cycles were 0.21, 0.42, 0.525, and 0.525 respectively.

After completing this procedure, the various heparin species were assayed to determine their mucopolysaccharide masses and biologic potencies. The relative abundances and specific anticoagulant activities of $H(B_1)$, $H(B_2)$, $H(B_3)$, $H(B_4)$, $H(B_5)$, $H(B_6)$, and $H(U_6)$ are provided in Table 1. Results obtained for intermediate fractions $H(U_1)$ through $H(U_5)$ have been omitted. As expected from similar fractionations conducted with mucopolysaccharide derived from other sources "active" HMW heparin species appear to exhibit differing affinities for antithrombin and varying biologic potencies. Statistical analyses revealed that $H(B_1)$ and $H(B_2)$ possess specific anticoagulant activities which are indistinguishable. However, a significant reduction in this parameter was observed for $H(B_3)$, $H(B_4)$, $H(B_5)$, and $H(B_6)$. Based upon this data, it believed that $H(B_1)$ and $H(B_2)$ are homogeneous with respect to their ability to bind to and activate antithrombin.

EXAMPLE 2

Affinity Fractionation of LMW Heparin

A mucopolysacchride preparation of 6500 daltons (LMW heparin) was fractionated through four cycles of separation as described above, except that the molar ratios of antithrombin to heparin were maintained at 0.05 during each step of isolation. The relative abundances and specific anticoagulant activities of the various components are given in Table I. The results are in good accord with previously reported fractionation data obtained with a similar preparation of mucopolysacchride by a far more laborious tachnique (see data given in parenthesis in Table I). However, it should be noted that the molar yield of mucopolysacchride per mole of protease inhibitor utilized during the initial four cycles of affinity separation averaged 0.94 with LMW heparin but only 0.47 with HMW mucopolysaccharide. These findings confirm the previous observation that LMW active heparin bears a single interaction site for antithrombin but also indicates that HMW active heparin species contain two discrete binding domains for the mucopolysacchride.

EXAMPLE 3

Affinity Fractionation of HMW Heparin Alternative Procedure

Subsequently, a preparative technique was designed to isolate the most active form of HMW heparin. To this end, 264 mg of antithrombin were added to the above mucopolysaccharide preparation at a molar ratio of 0.21. Subsequently, 120 ml of Concanavalin A-Sepharose ("packed gel") were admixed and the resultant slurry was incubated at 24° for 30 min. This mixture was then placed in a column (2.5×25 cm), the matrix was washed with buffer and the bound mucopolysaccharide was harvested as described above. On occasion, the final heparin product was freed of trace levels of antithrombin by DEAE-cellulose chromatography. The specific anticoagulant activity of this material is 731±40 units/mg (average of 6 large scale fractionations). This preparation of heparin could not be subfractionated into components with higher biologic potencies by employing molar ratios of inhibitor to mucopolysaccharide smaller than 0.07. Thus the highly active HMW product described above appears to be relatively homogeneous with respect to its interactions with antithrombin.

TABLE I

Affinity fractionation of high and low molecular weight heparin species
These data are taken from two representative fractionations.

| Cycle | Fraction | High Molecular Weight | | Low Molecular Weight | |
|---|---|---|---|---|---|
| | | Initial Sample Mass % | Specific Anticoagulant Activity Units/mg | Initial Sample Mass % | Specific Anticoagulant Activity Units/mg |
| 1 | H(B$_1$) | 10.5 | 703 | 4.2 | 376 (383)[b] |
| 2 | H(B$_2$) | 11.2 | 650 | 2.9 | 388 (384)[b] |
| 3 | H(B$_3$) | 9.1 | 572 | 5.3 | 316 (364)[b] |
| 4 | H(B$_4$) | 16.6 | 467 | 5.2 | 283 (348)[b] |
| 5 | H(B$_5$) | 12.8 | 400 | — | — |
| 6 | H(B$_6$) | 7.0 | 280 | — | — |
| | Total | 67.2 | | | |
| 6 | H(U$_6$) | 32.8 | 29 | | |

[a]These statements were calculated from the relative amounts of mucopolysaccharide partitioning at each cycle of fractionation.
[b]Data given in parenthesis represents previous values of specific anticoagulant activity obtained with a similar preparation of low molecular weight heparin and identical ratios of protease inhibitor to mucopolysaccharide. These latter estimates were collected with the more laborious affinity fractionation technique utilizing gel filtration methodology of Rosenberg (U.S. Pat. No. 4,301,153).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for affinity fractionation of heparin and isolation of a highly active anticoagulant fraction, said process comprising:
   (a) providing Concanavalin A immobilized on a solid substrate;
   (b) providing a heparin preparation of animal tissue origin;
   (c) incubating said heparin preparation with a quantity of antithrombin extracted from mammalian plasma to complex a portion of the heparin with the antithrombin;
   (d) contacting the incubation product of step c with said immobilized Concanavalin A to bind said complex to the immobilized concanavalin A solid phase and to separate a depleted heparin pool as the liquid phase; and
   (e) selectively eluting the heparin from the solid phase and recovering the eluted heparin as said highly active anticoagulant fraction.

2. A process in accordance with claim 1 further comprising:
   washing said solid phase to desorb said antithrombin; and
   incubating said depleted heparin pool with a second quantity of antithrombin to complex an additional portion of the heparin with the antithrombin and then repeating steps (d) and (e).

3. A process in accordance with claim 2 wherein the steps of washing and incubating said depleted heparin pool are repeated one or more times to isolate additional highly active anticoagulant fractions.

4. A process in accordance with claim 1 wherein step d involves passing the incubation product of step c through a column of said immobilized concanavalin A.

5. A process in accordance with claim 1 wherein step d involves slurrying the incubation product of step c with said immobilized concanavalin A and incubating said slurry.

6. A process in accordance with claim 1 or 5 wherein said heparin preparation is a high molecular weight fraction of 18,000–22,000 daltons.

7. A process in accordance with claim 1 or 4 wherein said heparin preparation is a low molecular weight fraction of 6000–8000 daltons.

8. A method in accordance with claim 1 further comprising removing trace levels of antithrombin from said eluted heparin fraction by DEAE cellulose chromatography.

9. A method in accordance with claim 1 wherein said solid substrate is Sepharose 4B.

10. A process in accordance with claim 6 wherein said high molecular weight fraction is isolated by chromatography from heparin extracted from tissue from the group consisting of beef, porcine, sheep and whale tissue.

11. A process in accordance with claim 7 wherein said low molecular weight fraction is isolated by chromatography from heparin extracted from tissue from the group consisting of beef, procine, sheep and whale tissue.

12. The process of claim 1 wherein said antithrombin is extracted from human plasma.

13. A method for affinity fractionation of heparin from a heparin pool containing heparin capable of binding with antithrombin to separate the antithrombin binding heparin into fractions of varying anticoagulant activity, said process comprising:
- (a) providing a heterogeneous heparin pool of animal tissue origin, said pool containing heparin of varying anticoagulant activity;
- (b) incubating said heparin of step a with a quantity of antithrombin being sufficient only to complex a fraction of the heparin constituting a minor portion of the heparin in the pool capable of binding with antithrombin, said fraction of heparin having a higher antithrombin binding affinity than that of the heparin which remains in the uncomplexed pool, to produce a heparin-antithrombin complex in which the complexed heparin has a higher specific anticoagulant activity than the heparin remaining in the depleted pool;
- (c) isolating the complex of step b from the heparin pool;
- (d) separating the heparin from the antithrombin-heparin complex isolated in step c to produce heparin of higher specific anticoagulant activity than the specific activity of the depleted heparin pool;
- (e) incubating said depleted heparin pool with a larger molar ratio of antithrombin than used in step b to form an antithrombin-heparin complex in which the heparin of the complex has a lower specific anticoagulant activity than the heparin product of step d but higher than the specific activity of the heparin remaining in the now further depleted heparin pool;
- (f) isolating the complex of step e from the now further depleted heparin pool; and,
- (g) separating the heparin from the antithrombin-heparin complex isolated in step f to produce heparin of lower specific anticoagulant activity than the specific activity of the heparin produced in step d and higher than the specific activity of the heparin remaining in the further depleted heparin pool.

14. The process as set forth in claim 13 wherein the incubating, isolating and separating steps are repeated with progressively larger increments of antithrombin in the incubating step until all the antithrombin binding heparin is separated from the further depleted heparin pool.

15. A process in accordance with claim 14 wherein said molar ratio of antithrombin to heparin used in the incubating steps is within the range of 0.01:1 and 0.5:1.

16. A process in accordance with claim 15 wherein the complex is isolated in step c by density centrifugation.

17. A process in accordance with claim 15 wherein the complex in step c is isolated by affinity chromatography on a DEAE ion-exchange affinity resin.

18. The process of claim 15 wherein the molar ratio of antithrombin to heparin used in step b is 0.21:1.

19. The process of claim 15 wherein the molar ratio of antithrombin to heparin used in step e is 0.42:1.

20. The process of claim 15 wherein the molar ratio of antithrombin to heparin used in the next incubating step is 0.525:1.

21. The heparin fraction of step d of the process of claim 13 having a specific activity of 731±40 units/mg.

22. A process in accordance with claim 13 wherein step a further comprises fractionating the heparin of animal tissue origin to provide a high molecular weight fraction of 18,000–20,000 daltons for use in step b.

23. A process in accordance with claim 13 wherein step a further comprises fractionating the heparin of animal tissue origin to provide a low molecular weight fraction of 6,000–8,000 daltons for use in step b.

* * * * *